July 24, 1962 H. LIEBHERR ETAL 3,045,837
ROTARY TOWER CRANE
Filed Dec. 23, 1959 4 Sheets-Sheet 1

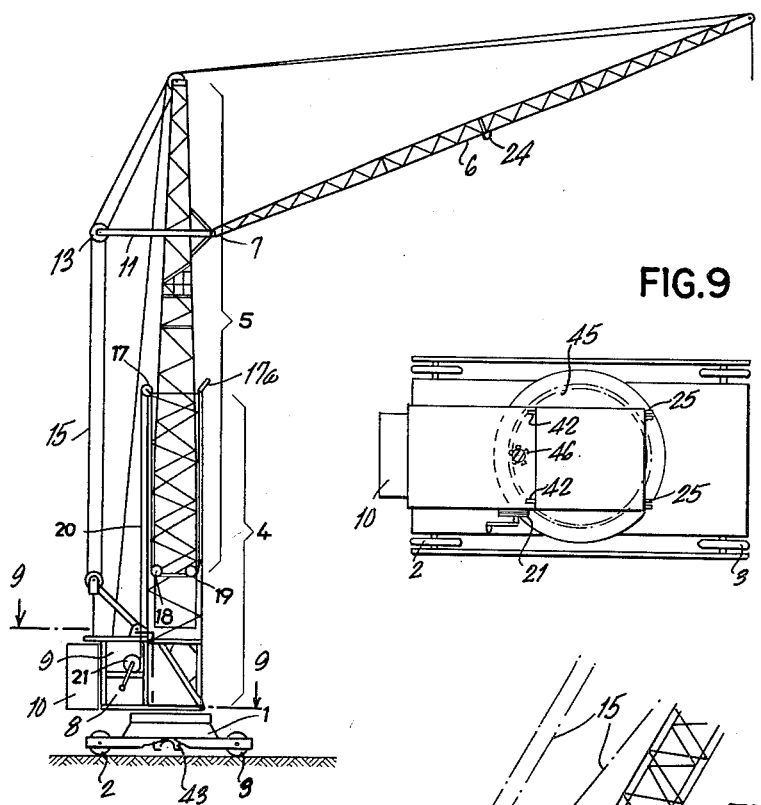
FIG.2
FIG.9
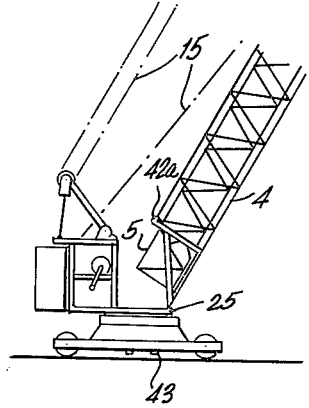
FIG.10
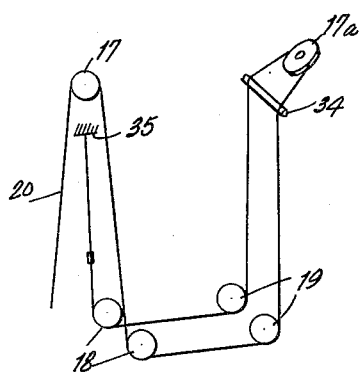
FIG.8a

July 24, 1962  H. LIEBHERR ET AL  3,045,837
ROTARY TOWER CRANE
Filed Dec. 23, 1959  4 Sheets-Sheet 3
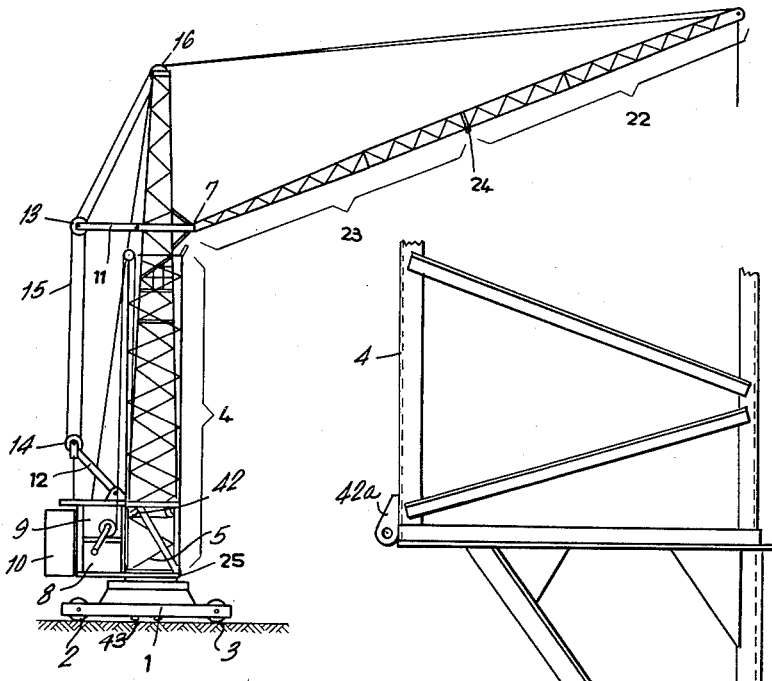
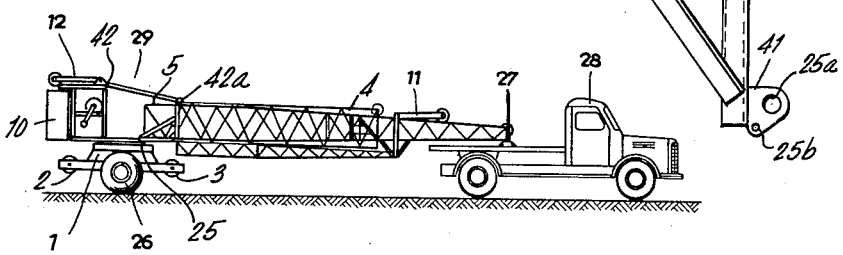
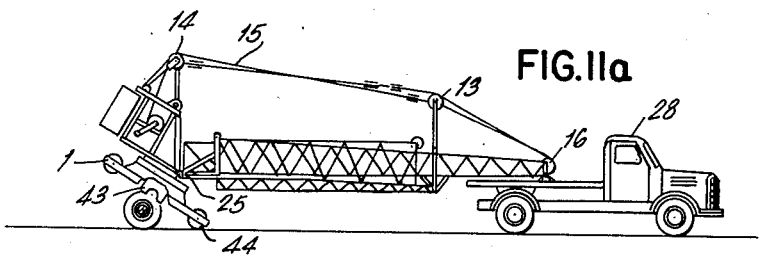

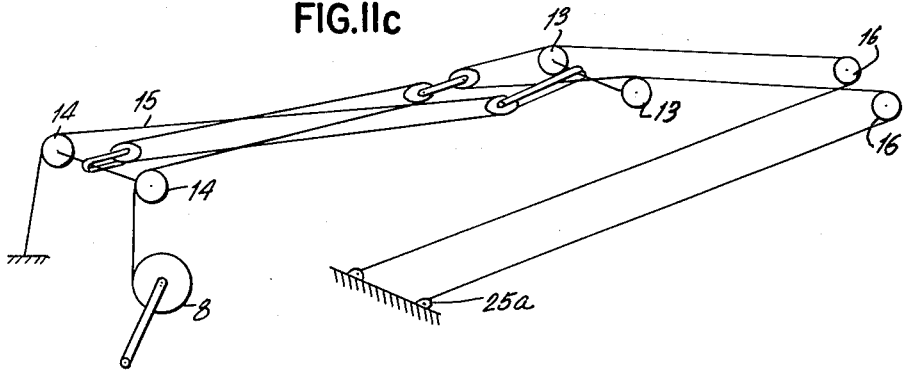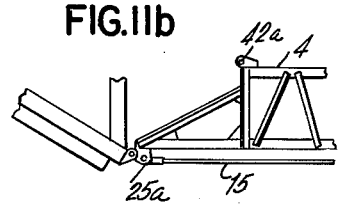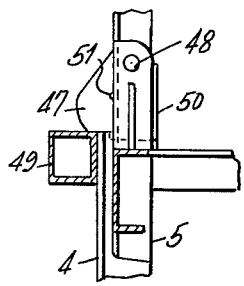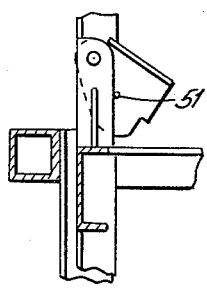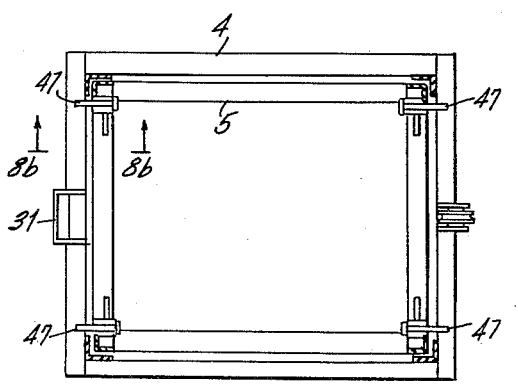

United States Patent Office
3,045,837
Patented July 24, 1962

3,045,837
ROTARY TOWER CRANE
Hans Liebherr, Memminger Str. 78, and Elmar Reich, Schmelzweg 9, both of Biberach an der Riss, Germany
Filed Dec. 23, 1959, Ser. No. 861,616
3 Claims. (Cl. 212—46)

This invention relates to improved rotary tower cranes of the type capable of being erected and dismantled for transportation from one building site to another.

This application is a continuation-in-part of Serial No. 550,155, filed November 30, 1955, now abandoned.

In recent years rotary tower cranes of lightweight as well as heavier constructions have been used to an ever increasing extent on the sites of construction projects, since such cranes are particularly adapted by their general construction to be quickly erected and dismantled and to be easily transported from one building site to another. In a rotary tower crane of known construction the tower or column can be swung downwardly in relation to the crane undercarriage so that its top portion can be supported by a suitable tractor, whereas the undercarriage during transit serves as a trailer supporting the lower portion of the tower or column.

According to the present invention, the advantageous feature of easy portability of cranes of the type mentioned is also provided in rotary tower cranes having a tower of great height by providing a tower comprising telescoping sections and by providing for the length of the crane boom to be reduced in a suitable manner. Thus, it will be possible also in the case of rotary tower cranes having a tower of such length that transit over public roads would be prohibited by traffic laws to retain the advantageous feature of using the crane undercarriage as a supporting trailer for the folded down tower. It will be understood that by the use of telescoping tower sections and by reducing the length of the boom, either also by providing telescoping sections or in another suitable manner for example by folding the individual sections back onto themselves, it is possible to obtain a compact unit the length of which does not exceed the maximum dimensions prescribed by traffic laws.

In a specific embodiment of the invention, the various sections of the tower may be arranged to be telescoped in and out by means of a cable or cables. In this case, no additional auxiliary means are required to extend the said telescoping sections during the erection of the crane and thus to obtain the required height of the crane tower. According to another particularly advantageous feature of the invention the cable used to extend or retract the telescoping tower sections is actuated by an existing cable winch already provided on the crane.

It is one object of the invention to improve easily transportation of cranes of the type mentioned by supporting the top end of the upper tower portion on a tractor whereby a special supporting trailer for the crane can be dispensed with and its transport length is shortened.

Another object of the invention is extremely to shorten the determined length of modern cranes for transit on the one hand and simultaneously to increase the height of the mast and the range of the boom to adapt the crane to the different flat in skyscraper building without carrying away anything.

Still a further object of the invention is to provide means for steering the end of the dismantled tower into the opposite direction by a workman riding the undercarriage in order to facilitate to pass around corners.

At least it is an object of the invention too providing an easy connection of a wheeled axle to the undercarriage of a crane without the aid of any auxiliary means to lift the undercarriage on said wheeled axle.

These and other advantages of the invention will become further apparent from the following detailed description, reference being made to the accompanying drawings showing a preferred embodiment of the invention. It is to be expressly understood, however, that the drawings are for purposes of illustration only and are not intended as a definition of the limits of the invention, reference for this latter purpose being had primarily to the appended claims.

In the drawings:

FIG. 2 is a view similar to FIG. 1 and shows the crane with its telescoping tower partly retracted.

FIG. 3 is similar to FIG. 2 but shows the crane after the retracting operation has been continued further.

FIG. 4 is a side elevational view showing the crane in its folded down position and ready for road travel with the aid of a tractor or similar vehicle.

FIG. 5 is an enlarged view of the telescoping portion of the crane showing in detail the construction of crane sections 4 and 5 and their relation to each other.

Figure 1:
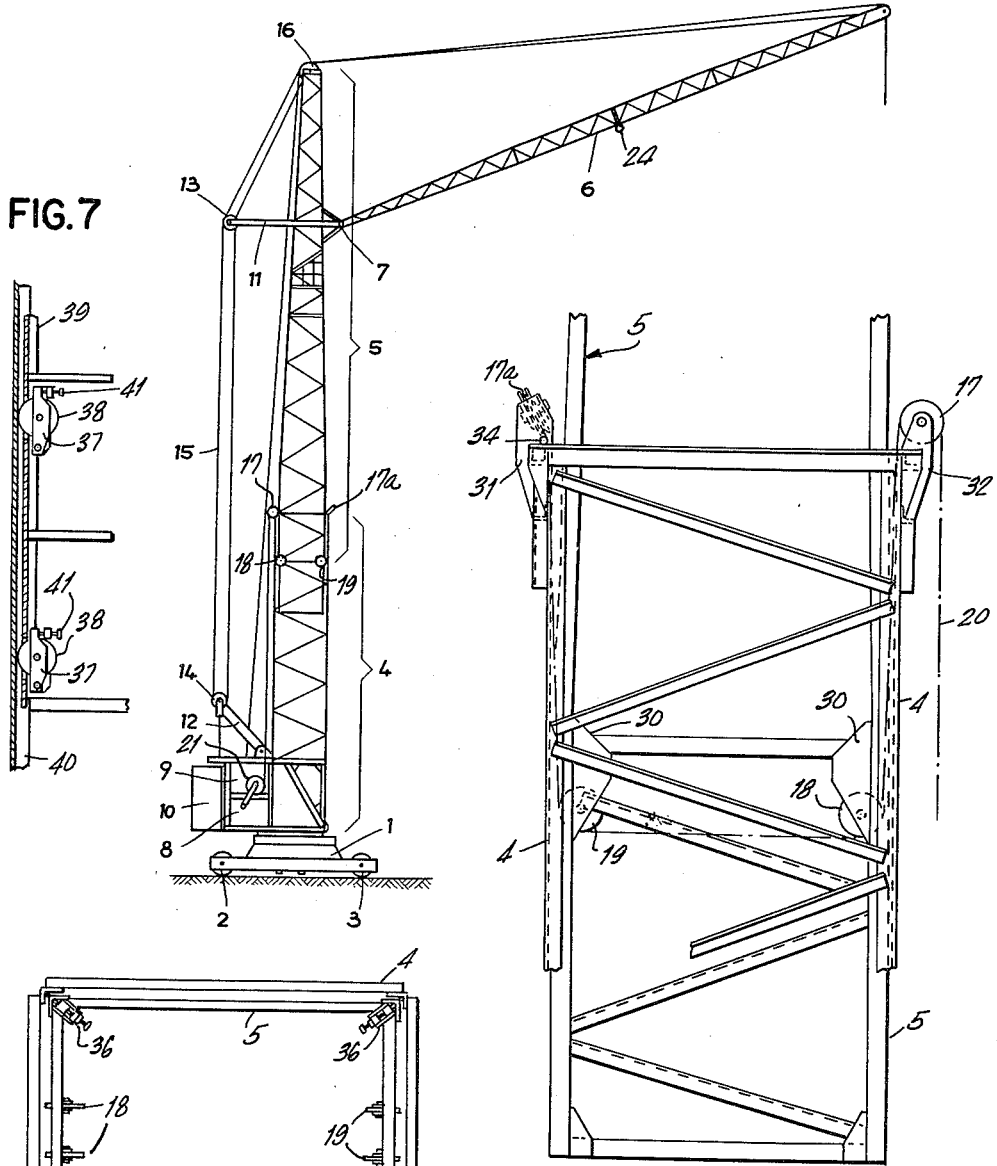
FIG. 1 is a side elevational view of the rotary tower crane of the invention, showing the crane ready for use at a building site with its tower fully extended.

FIG. 6 shows in horizontal cross section the relation of crane sections 4 and 5 illustrating trolley means for enabling crane section 5 to move down through crane section 4 during the telescoping step.

FIG. 7 is a vertical cross section taken along line 7—7 of FIG. 6 showing the trolley guide means effecting telescoping of upper crane section 5 through lower crane section 4.

FIGS. 8a to 8d are illustrative of the cable and pulley arrangement and mechanical elements employed for telescoping the vertical crane sections.

FIG. 9 is a horizontal view taken along line 9—9 of FIG. 2 showing the rotary mechanism of the crane and undercarriage.

FIG. 10 shows in partial view the manner in which the telescoped crane is pivoted forward in preparing it for transportation.

FIGS. 11a to 11c show the step of applying transport wheels 26 to the undercarriage shown in FIG. 4 and the cooperation of the cables with the various elements to achieve this.

FIG. 12 shows in detail the lower portion of crane section 4 with means to enable pivotal connection to the undercarriage.

Referring more particularly to FIG. 1, an undercarriage 1 having wheels 2 and 3 permitting the undercarriage to run on suitable tracks supports a crane tower or mast comprising two telescoping sections 4 and 5. The crane boom is pivoted to the mast by means of a bracket 7 and can be raised and lowered in a vertical plane.

The undercarriage 1 also supports the winch unit which is arranged to rotate in relation to the undercarriage together with the tower or mast 4 and 5 (note FIG. 9), the said winch unit comprising a winch 8 serving to raise and lower the boom and a winch 9 operating the hoisting gear of the tower. A ballast box 10 is adapted to receive a suitable balancing weight or counter weight.

Provided on the crane tower are supporting braces 11 and 12 respectively carrying guide pulleys 13 and 14 over which runs the boom operating cable extending over a further pulley 16 at the top of the tower and on to the free end of the boom.

Guide pulleys 17, 18 and 19 (FIG. 2) are provided for the purpose of lowering the upper tower section 5 telescope-fashion into the lower tower section 4 by means of a suitable tower mounting cable one end of which may be secured to a point on the upper part of the lower tower section 4, whereas the other end is led to a winch 21 (FIG. 2) which may be identical with a winch already provided on the crane for the purpose of operating the crane.

FIG. 3 indicates the configuration of the crane upon completion of the lowering of the upper tower section into the lower tower section. It will be understood that the crane can be operated in the usual manner, regardless whether the tower is partially retracted as in FIG. 2 or fully retracted as in FIG. 3. Moreover, when in the position of FIG. 3, the crane has reached an intermediate stage in its preparation, by folding down, for transit to another construction site.

From the position of FIG. 3 the crane is brought into its final transit position as shown in FIG. 4 by first paying out the boom operating cable to lower the boom, whereupon the two boom sections 22 and 23 are folded together by swinging the boom section 22 about the pivot 24. Following this the folded-down boom sections are swung against the lower section 4 of the crane tower and secured thereto. Then the crane tower, together with boom secured thereto, is folded down about the pivot 25. After the supporting braces 11 and 12 have been folded down in the manner indicated in FIG. 4, the crane is ready for transit.

Having described the broad aspects of the rotary tower crane reference is now made to the various detail structures. As has been stated hereinbefore, mast 5 is related telescopically to mast 4 so that it can be retracted therein. This is achieved by adapting the lower portion of mast 5 with pulleys for receiving a cable which is used to lower or raise the mast as shown in FIG. 5 and the diagrammatic representation of FIG. 8a.

FIG. 5 shows a portion of mast 5 partially nested or telescoped within a portion of bottom mast 4. Mast 5 like mast 4 is formed of a framework comprising vertically disposed angle irons held rigidly by cross members also of angle irons. At the lower portion of mast 5 pulleys 18 and 19 (a pair of each) are provided for receiving lifting cables. The pulleys are connected via their axle to reinforcing steel plates 30 on each side thereof, which plates are welded to the structure of mast 5. Additional pulleys 17, 17a are provided at the top of lower mast 4, pulley 17a lying in a plane inclined to the vertical axis of the mast and supported by bracket 31 rigidly mounted at the top of mast 4. Pulley 17 lies in a plane parallel to the vertical axis of the mast and is similarly supported by a bracket 32. With such a pulley arrangement, a mechanical advantage of four is provided as will be seen in the diagrammatic representation of the pulley system shown in FIG. 8a.

Referring to FIG. 8a cable 20 from the winding drum passes over pulley 17 fixed at the top of mast 4 and down around one set of pulleys 18, 19 of mast 5, up over roll 34 mounted on mast 4, around inclined pulley 17a, also fixed at the top of mast 4, down over roll 34, around the other set of pulleys 18, 19 and from pulley 18 to an anchor point 35 at the top of mast 4. If mast 5 is telescoped within mast 4, it is extended by putting tension on cable 20. When mast 5 reaches the fully extended position, means 47 for holding the mast in position are provided (see FIG. 8b). The means 47 is arranged about a pivot 48 and capable to swing under its own weight in the position shown in FIG. 8b in which it is resting on the most upper horizontal bar 19 of the lower section 4 of the mast and holding thereby the upper portion 5 in position. The holding means 47 is provided with a flange 50 in order to limit the pivoting movement of the means 47 in its holding position for the upper section of the mast. The holding means 47 is further provided with a hole 51 for insertion of a lock bolt when the mast is in its extended position. When the mast is to be retracted the lock bolt is removed of the hole 51 by hand or cable. Then the cable 20 for raising and lowering the upper mast section is moved in order to raise the upper section a little and the holding means 47 is moved into the position shown in FIG. 8c by hand or cable, in which it is secured by inserting said lock bolt into said hole 51. Hereafter the upper section of the mast can be lowered. As seen in FIG. 8d there are four holding means 47, each near one corner of the mast.

In order to facilitate the telescoping of mast 5 into mast 4, trolley guide means are provided at the lower corner portions of mast 5 comprising a wheel and bracket assembly 36 so arranged that a portion of the wheel protrudes through slots in the corner angle iron of mast 5 and rides along the V of the corner angle iron of mast 4. This is shown more clearly in the horizontal view of FIG. 6 which shows upper mast 5 in telescoping relationship with lower mast 4. At each corner of mast 5 are provided a pair of trolley guide means 36 (note FIG. 7 taken along line 7—7 of FIG. 6) comprising bracket 37 containing wheel 38 which protrudes through prearranged slots in angle 39 of mast 5 so that the periphery of wheel 38 rides on the V tracks provided by angle 40 of lower mast 4 (FIG. 6). Setting means 41 are provided with the bracketed wheel to insure pressure bearing of wheel 37 against the angle iron track of mast 4 so that the masts are maintained in rigid union with one another, even under load.

After the mast 5 has been fully retracted as shown in FIG. 3 (which shows mast 5 fully retracted to the upper part of the undercarriage), in the event the tower is to be transported, booms 22 and 23 are folded together as described hereinbefore preparatory to pivoting the tower into transporting position as shown in FIG. 4. The details of the bottom of mast 4 are shown in FIG. 12 as comprising an ear of plate steel 41 having means 25b for receiving a steel pivot pin to form the pivot 25 shown in FIG. 3, the carriage having a steel bracket through which the pivot pin passes in forming the pivot joint with mast 4. Means 25a are also provided near 25b for receiving the one end of cables 15 during transport as well as in order to lift the mast in the upright position as well as in order to lift the undercarriage for inserting wheel 26 underneath the tilted undercarriage (see FIG. 11b). A fastening ear 42a is provided with means for receiving a fastening bolt so that mast 4 can be rigidly connected to the upper part of the carriage at 42 shown in FIG. 3 which may be a bracket or other similar connecting means.

In pivoting the tower forward, the fastening bolt is removed at 42 and the tower is then allowed to pivot forward about 25 via cables 15 as shown in FIG. 10.

For transit to another site, a wheeled axle 26 is mounted on the crane undercarriage; the top end of the upper tower portion is supported at 27 by a tractor 28, and an auxiliary brace 29 is fitted as shown in FIG. 4. The use of the crane undercarriage 1 as a chassis for the road axle 26 constitutes a saving insofar as a special supporting trailer for the crane can be dispensed with.

The wheeled axle is adapted to be received by bracket support means 43 (FIGS. 2, 10 and 11a–11c) at the bottom of the undercarriage, the axle being held in place by the weight of the carriage and the tower. After the tower has been lowered as illustrated in FIG. 10 to the horizontal position of FIG. 11 and the end connected to the vehicle, tension is continually applied to cables 15 until carriage 1 pivots against its end 44 and lifts up at its other end about pivot 25 whereby wheeled axle 26 can be inserted and pushed in place in bracket 43. The tension on the cables is released so that the carriage can assume the horizontal position shown in FIG. 4. After this has been achieved, auxiliary brace 29 is connected at its ends to 42a on the tower and 42 at the upper end of the carriage as shown, two braces being employed, one on each side. Thus, the tower in the horizontal position is rigidly connected to the carriage and ready for transportation. How the cables 15 are actuated in order to tilt the undercarriage is shown in FIGS. 11b and 11c. The one end of cables 15 for raising and lowering the boom as well as for raising and lowering the whole mast is connected with the eye 25a near the pivot 25 (see FIGS. 11b and 12). Therefore if the drum 8 for operating said cables 15 is actuated in sense of raising the boom or the mast, i.e. by rolling up the cables on the drum, after the ballast box 10 is freed from its balancing weight, the undercarriage is tilted about pivot 25. When the undercarriage is in its tilted position, wheel 26 may be inserted between the bracket support means 43.

The winch unit or housing which is supported by the undercarriage is arranged to rotate in relation to the undercarriage via a bearing (not shown) between the unit and the undercarriage the rotation being made possible by a large internal gear 45 in the undercarriage and a pinion 46 meshed therewith. Actuating means (not shown) co-operating with pinion 46 is used to rotate one with respect to the other. In the transport position such a means may comprise a handle connected via means to the pinion and operated by a workman riding the undercarriage to aid in steering the dismantled tower around corners. Thus, when the transport vehicle turns left to take a corner, the workman operating the undercarriage turns the handle actuating the pinion so that the undercarriage turns right so as to enable the whole structure to take the corner easily.

It will be apparent from the foregoing that by folding down the boom and by telescoping together the tower sections a portable unit is obtained whose length does not exceed the maximum length permitted by traffic laws and regulations.

It will be obvious to those skilled in the art that many modifications and variations of the embodiments herein disclosed can be effected without departing from the spirit and scope of the invention which is defined in the appended claims.

What is claimed is:

1. A portable crane comprising a wheeled undercarriage, a horizontally rotatable platform supported by said undercarriage, a collapsible tower supported at its base portion with said platform, a winch system and a housing associated with the base portion of said tower, said tower having a lower mast pivotally connected at its bottom corner to said platform and at least one upper mast coextensive therewith, pulley and cable means associated with said winch adapted to telescope said at least one upper mast within the mast below it, disconnectable means for rigidly connecting the lower mast in its vertical position to the housing of said winch system, a boom pivotally connected to the uppermost mast of said tower and adapted to be raised and lowered under load by swinging movement in a vertical plane via a pulley and cable system also operably associated with said winch system, said boom being formed of pivotally connected sections whereby one boom section is foldable alongside another, means associated with said undercarriage and said platform to effect rotation in a horizontal plane of said platform with respect to the undercarriage, means at the bottom of the undercarriage for receiving transit wheels and axle and connecting means at the free end of the tower for connecting the tower to a vehicle for transit.

2. A portable crane comprising a wheeled undercarriage, a horizontally rotatable platform supported by said undercarriage, a collapsible tower supported at its base portion with said platform, a winch system and a housing associated with the base portion of said tower, said tower having a lower mast pivotally connected at its bottom corner to said platform and an upper mast coextensive therewith, said upper mast being provided at its lower end portion with pulley means which cooperate via pulley means at the top of said lower mast and cable means from said winch system to effect telescopic retraction of said upper mast into said lower mast, disconnectable means for rigidly connecting the lower column in its vertical position to the housing of said winch system, a boom pivotally connected to the uppermost column of said tower and adapted to be raised and lowered under load by swinging movement in a vertical plane via a pulley and cable system also operably associated with said winch system, said boom being formed of pivotally connected sections whereby one boom section is foldable alongside another, gear means associated with said undercarriage and said platform to effect rotation in a horizontal plane of one with respect to the other, means at the bottom of the undercarriage for receiving transit wheels and axle, means at the lower end of the tower and at the winch housing for receiving stiffening braces when the tower is folded horizontal for transit, and connecting means at the free end of the tower for connecting the tower to a vehicle for transit.

3. The portable crane of claim 2 wherein trolley guide means including wheels are provided in the lower portion of each corner of said upper mast, wherein slots are provided at the corners of said upper mast, the wheels protruding through slots at said corners, whereby the wheels are adapted to ride along the inner corners of the lower mast when the upper mast is retracted within the lower mast.

References Cited in the file of this patent

UNITED STATES PATENTS

| | | |
|---|---|---|
| 2,428,163 | Hubbard | Sept. 30, 1947 |

FOREIGN PATENTS

| | | |
|---|---|---|
| 458,118 | Italy | July 1, 1950 |
| 291,599 | Switzerland | Sept. 16, 1953 |
| 1,117,075 | France | Feb. 13, 1956 |
| 805,398 | Great Britain | Dec. 3, 1958 |